Patented Oct. 10, 1922.

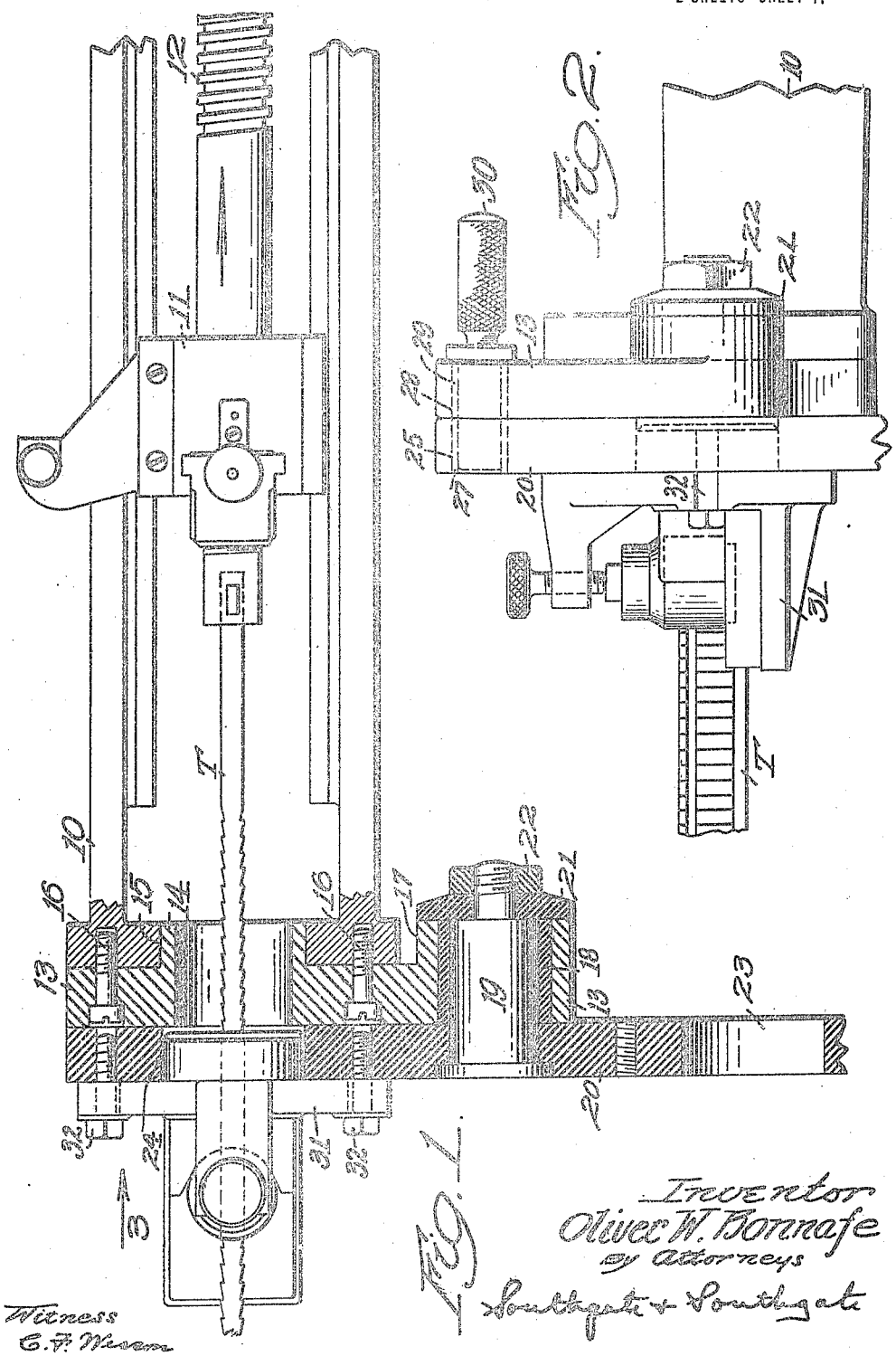

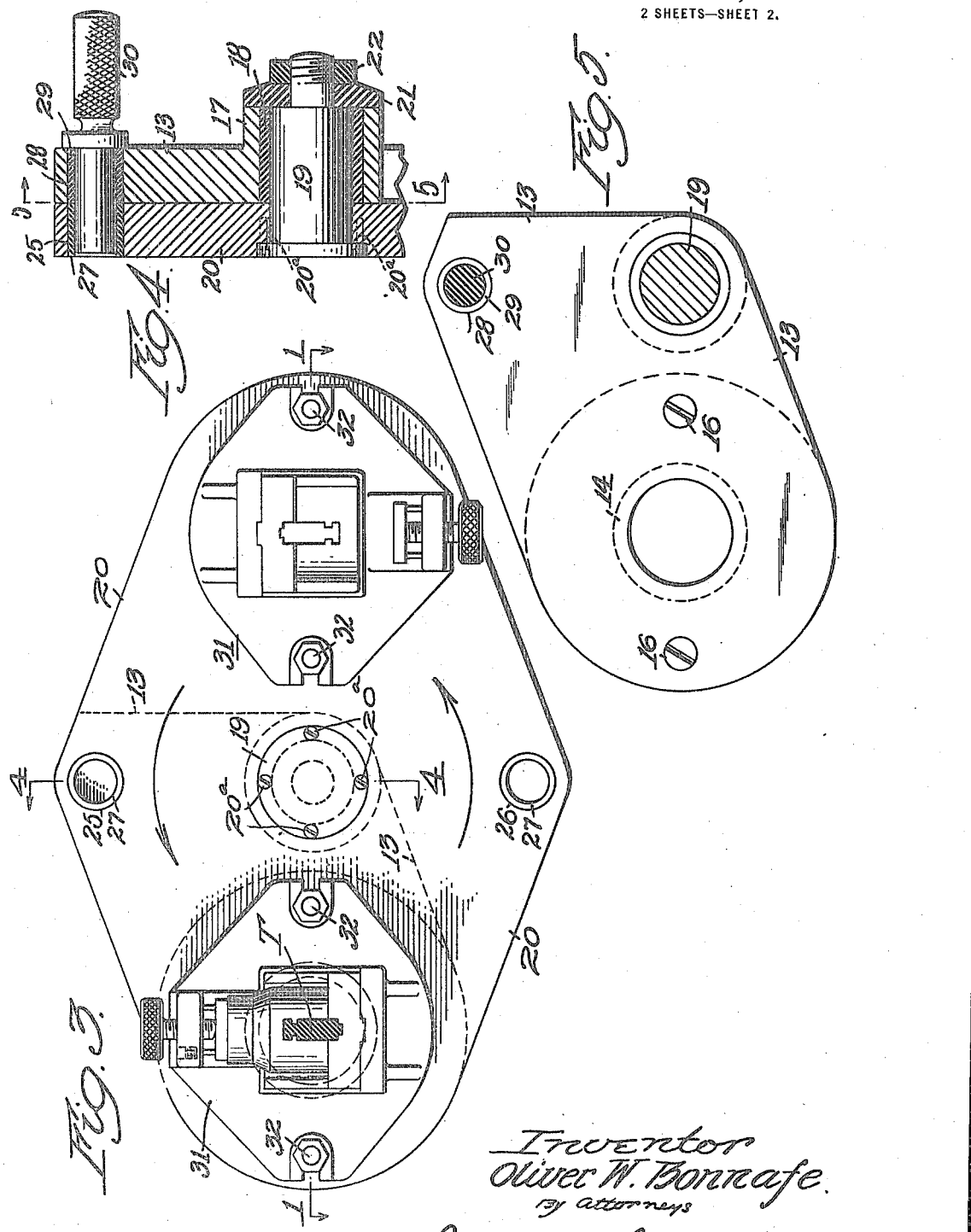

1,431,624

UNITED STATES PATENT OFFICE.

OLIVER W. BONNAFE, OF CENTRAL FALLS, RHODE ISLAND, ASSIGNOR TO LAPOINTE MACHINE & TOOL COMPANY, OF HUDSON, MASSACHUSETTS, A CORPORATION OF MAINE.

WORK-SUPPORTING DEVICE FOR BROACHING MACHINES.

Application filed April 15, 1920. Serial No. 374,221.

*To all whom it may concern:*

Be it known that I, OLIVER W. BONNAFE, a citizen of the United States, residing at Central Falls, in the county of Providence and State of Rhode Island, have invented a new and useful Work-Supporting Device for Broaching Machines, of which the following is a specification.

This invention relates to a work-supporting device, particularly designed for use in a broaching machine.

It is frequently necessary in using a broaching machine to provide special clamps or fixtures in which the work is held during the broaching operation. It is the object of my invention to provide a work-supporting device so constructed that the operator can insert a piece of work in one fixture while the machine is operating upon a duplicate piece of work held in a second fixture. By this construction the machine may be operated almost continuously, increasing the output of the machine and materially decreasing the labor cost.

My invention further relates to arrangements and combinations of parts hereinafter described and more particularly pointed out in the appended claims.

A preferred form of my invention is shown in the drawings, in which—

Fig. 1 is a plan view of a portion of a broaching machine with my improvements applied thereto, certain parts being shown in section on the line 1—1 of Fig. 3.

Fig. 2 is a side elevation of the work-supporting device;

Fig. 3 is a left-hand end elevation of the parts shown in Fig. 1;

Fig. 4 is a detail vertical sectional view taken along the line 4—4 in Fig. 3; and Fig. 5 is a sectional elevation taken along the line 5—5 in Fig. 4.

Referring to the drawings, I have shown a portion of a broaching machine having a bed or frame 10, in which a draw head 11 is movable longitudinally by means of a threaded rod or shaft 12. A plate or casting 13 (Figs. 1 and 5) is provided with a boss or projection 14 fitting closely in the opening 15 in the frame 10 through which the broaching tool T is operated. The plate 13 is rigidly secured to the frame 10 by a plurality of bolts 16, and is also provided with a second projection 17 having a bushing 18 in which a stud 19 is freely rotatable.

The stud 19 is fixed to a double face plate 20 (Fig. 3) by screws 20ª and forms a bearing for said plate. The stud 19 extends through the face plate 20 and bushing 18 and is held in position by a washer 21 and nut 22.

The face plate 20 is provided with a pair of oppositely disposed openings 23 and 24, either one of which may be aligned with the opening 15 in the frame 10. The face plate is also provided with additional oppositely disposed holes 25 and 26, in which hardened bushings 27 are preferably inserted. These openings 25 and 26 are aligned with an opening 28 in the upper portion of the fixed plate 13, which opening may be also provided with a bushing 29. A locking pin 30 may be inserted through the bushing 29 and one of the bushings 27 to hold the face plate 20 rigidly in position with one or the other of its openings 23 or 24 aligned with the opening 15 and the broaching tool T.

Special work holding fixtures 31 of any desired type may be secured to the face plate 20 by clamping screws 32. The work holding fixture shown in the drawings is merely illustrative and forms no part of my present invention.

Having described the construction of my improved work-supporting device, the operation thereof is as follows:

The operator places a piece of work in one of the fixtures 31 and then turns the plate 20 so that the work is aligned with the opening 15. The operator then inserts the broaching tool T and connects the same with the draw head 11, after which the machine is started to pull the tool T through the work. During this operation, the operator loads the second fixture 31 and as soon as the broaching operation is completed, he removes the broaching tool, reverses the movement of the draw head 11, withdraws the locking pin 30 and turns the face plate 20 to bring the second piece of work to operative position. As soon as the draw head 11 is again in its initial position, he reinserts the broaching tool and the operation is repeated. In this way, the operator is enabled to keep the machine in practically continuous operation and loads and unloads the fixtures in time which would otherwise be lost.

Having thus described my invention, it will be evident that changes and modifications can be made therein by those skilled in the art within the spirit and scope of my invention as set forth in the claim and I do not wish to be otherwise limited to the details herein disclosed, but what I claim is:—

A broaching meachine having in combination, a frame, a broaching tool mounted therein, the end of said frame having an opening through which said tool is operable, a work supporting plate rotatably mounted on the end of said frame and having a fixed bearing in said frame, said plate having two openings spaced apart therein, a locking device effective to lock said plate in either of two operative positions with one or the other of said openings substantially aligned with the tool opening in the end of said frame, and means to independently secure pieces of work in fixed position on said plate one at each of the two openings therein.

In testimony whereof I have hereunto affixed my signature.

OLIVER W. BONNAFE.